(12) United States Patent
Konishi

(10) Patent No.: US 6,915,119 B1
(45) Date of Patent: Jul. 5, 2005

(54) TELEPHONE AND DATA TRANSMITTING METHOD FOR TELEPHONE

(75) Inventor: Masahiro Konishi, Asaka (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 204 days.

(21) Appl. No.: 09/695,867

(22) Filed: Oct. 26, 2000

(30) Foreign Application Priority Data

Oct. 29, 1999 (JP) .......................................... 11-308645

(51) Int. Cl.[7] ................................................ H04B 1/04
(52) U.S. Cl. .................... 455/127.1; 455/574; 455/566
(58) Field of Search ............................ 455/127.1, 574, 455/566, 573, 90.1–90.3, 11.1, 556, 41, 419, 420, 575, 550, 66, 445

(56) References Cited

U.S. PATENT DOCUMENTS

| | | | | |
|---|---|---|---|---|
| 5,559,860 A | * | 9/1996 | Mizikovsky | ................ 455/415 |
| 6,263,218 B1 | * | 7/2001 | Kita | ........................... 455/575 |
| 6,317,609 B1 | * | 11/2001 | Alperovich et al. | ........ 455/556 |
| 6,330,244 B1 | * | 12/2001 | Swartz et al. | ............... 455/556 |
| 6,377,818 B2 | * | 4/2002 | Irube et al. | ................. 455/556 |
| 6,427,078 B1 | * | 7/2002 | Wilska et al. | ............... 455/550 |
| 6,438,585 B2 | * | 8/2002 | Mousseau et al. | .......... 455/556 |
| 6,449,495 B1 | * | 9/2002 | Kuba | ......................... 455/557 |
| 6,466,202 B1 | * | 10/2002 | Suso et al. | .................. 455/566 |
| 6,477,353 B1 | * | 11/2002 | Honda et al. | .............. 455/11.1 |
| 6,539,240 B1 | * | 3/2003 | Watanabe | ................... 455/566 |
| 6,615,057 B1 | * | 9/2003 | Pettersson | ................... 455/419 |

FOREIGN PATENT DOCUMENTS

| | | |
|---|---|---|
| JP | 7-219967 | 8/1995 |
| JP | 8-88841 | 4/1996 |
| JP | 10-126565 | 5/1998 |
| JP | 10-215397 | 8/1998 |

* cited by examiner

Primary Examiner—Edward F. Urban
Assistant Examiner—Lana Le
(74) Attorney, Agent, or Firm—McGinn & Gibb, PLLC

(57) ABSTRACT

A telephone comprises designating devices that designate an apparatus to which received data of an image and/or characters is to be transmitted, and a wireless communicating device that communicates with the apparatus without a transmitting provider and transmits the data to the apparatus designated by the designating devices. In addition, the desired apparatus can display or store the data received through the transmitting provider.

40 Claims, 4 Drawing Sheets

F I G. 4
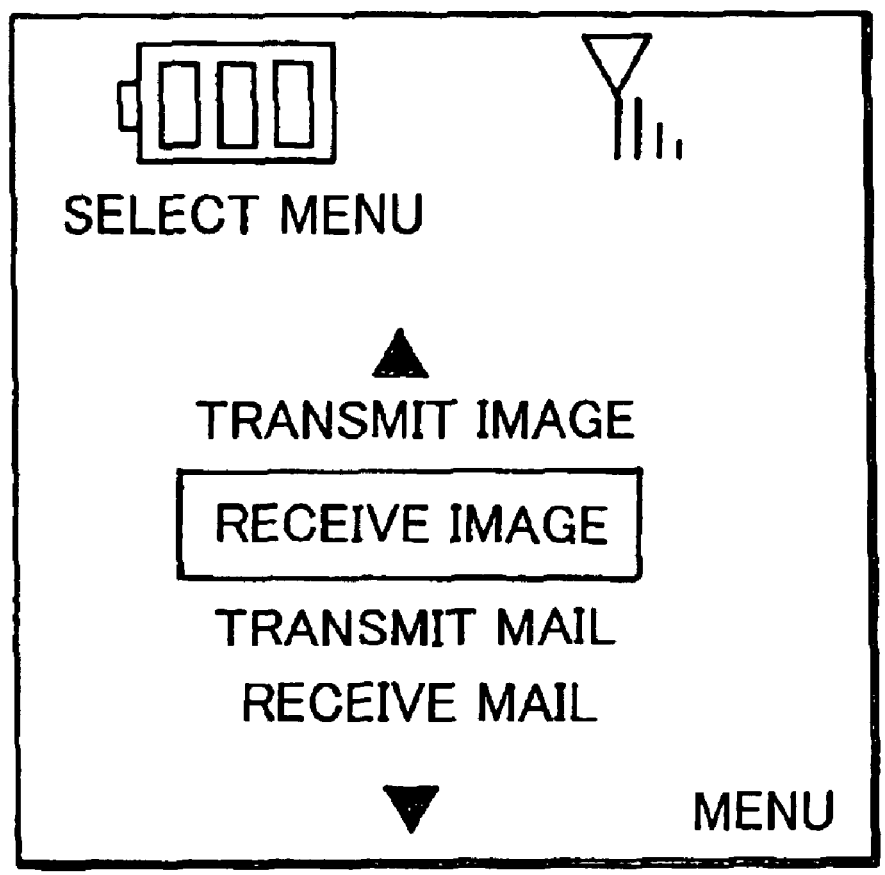

TELEPHONE AND DATA TRANSMITTING METHOD FOR TELEPHONE

BACKGROUND OF THE INVENTION

1. Field of the Invention

The present invention generally relates to a telephone and a data transmitting method for the telephone, and more particularly to a telephone that transmits data received through a transmitting provider to an apparatus by wireless and a data transmitting method for the telephone.

2. Description of Related Art

Japanese Patent Provisional Publication No. 7-219967 discloses an image searching apparatus that receives and displays still images and obtains a desired image selected from the still images. Japanese Patent Provisional Publication No. 10-215397 discloses a digital electronic camera that displays index images and receives a desired image selected from the index images.

Japanese Patent Provisional Publication No. 10-126565 discloses a connecting device that connects apparatuses such as a camera and a scanner and a terminal with a memory card, cables and a wireless communicating device. Japanese Patent Provisional Publication No. 8-88841 discloses a TV cellular phone that compresses an obtained image and transmits the compressed image to an apparatus, which displays the image.

In recent years, cellular phones have been developed, and they are capable of inputting and outputting character data and simple image data. Also, digital cameras and digital color printers are now being widely used, and digital images can be easily inputted and outputted. However, even a developed cellular phone can not display and store an image of high quality due to its small recording capacity and poor performance.

The image searching apparatus in Japanese Patent Provisional Publication No. 7-219967 and the digital electronic camera in Japanese Patent Provisional Publication No. 10-215397 can not transmit received image data to apparatuses by wireless. The connecting device in Japanese Patent Provisional Publication No. 10-126565 and the TV cellular phone in Japanese Patent Provisional Publication No. 8-88841 only have devices that receive images and transmit the images to transmitting providers.

SUMMARY OF THE INVENTION

The present invention has been developed in view of the above-described circumstances, and has as its object the provision of a telephone and a data transmitting method for the telephone in which a desired apparatus can display and store image, voice or character data received through a transmitting provider.

To achieve the above-described object, the present invention is directed to a telephone that receives data of at least one of an image and characters through a transmitting provider, comprising: a designating device that designates an apparatus to which the received data is to be transmitted; and a wireless communicating device that communicates with the apparatus without the transmitting provider and transmits the data to the apparatus designated by said designating device.

According to the present invention, the telephone comprises the designating device that designates an apparatus to which the received data of an image and/or characters is to be transmitted, and the wireless communicating device that communicates with the apparatus without the transmitting provider and transmits the data to the apparatus designated by the designating device. Thus, the desired apparatus can display or store the data received through the transmitting provider.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a diagram showing a menu selecting picture displayed in the data transmitting method.

DETAILED DESCRIPTION OF THE PREFERRED EMBODIMENT

Hereunder the preferred embodiment of the present invention is explained in detail according to the accompanying drawings.

Figure 1:
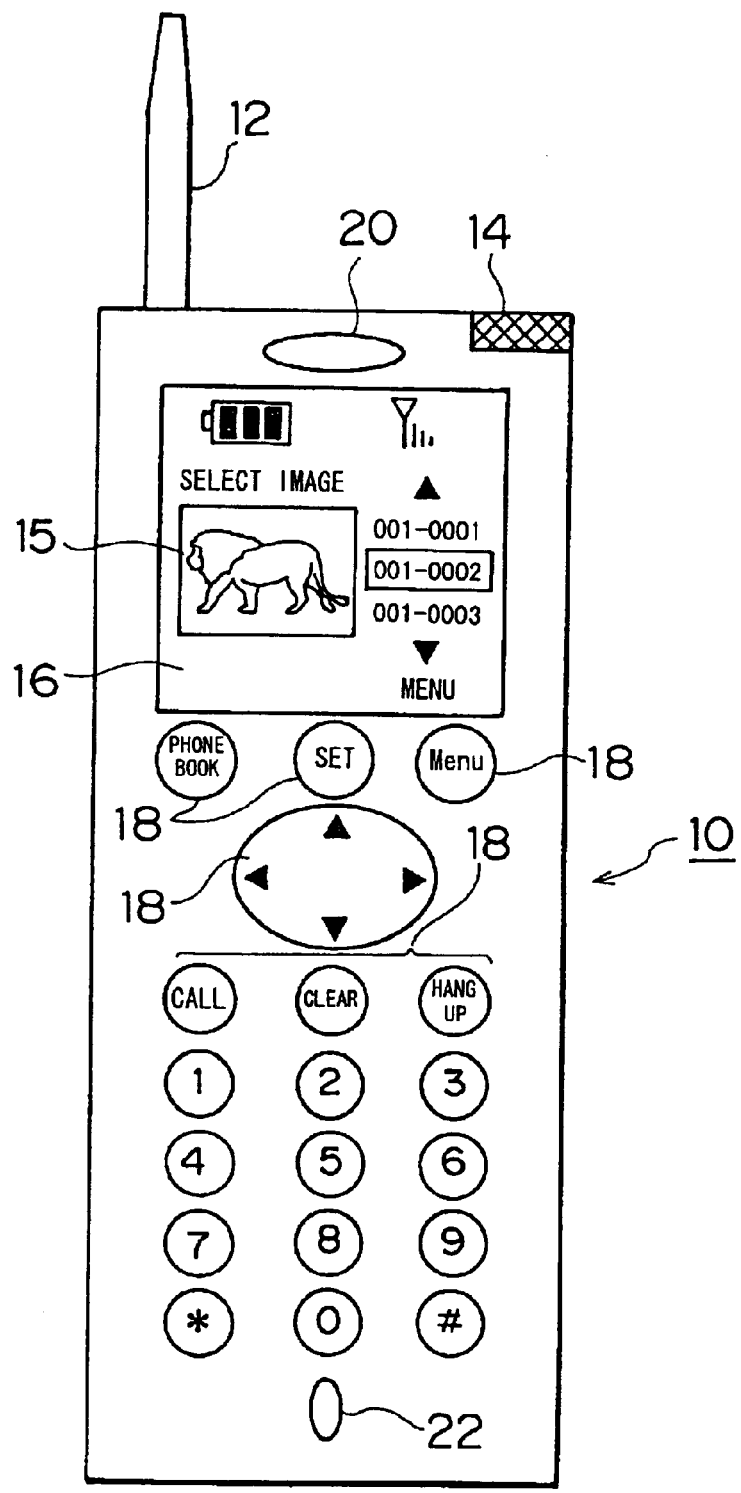
FIG. 1 is an outside view showing a telephone to which the present invention is applied.

FIG. 1 is an outside view showing a telephone 10 to which the present invention is applied.

As shown in FIG. 1, the telephone 10 comprises an antenna 12 for communicating with a transmitting provider by wireless, a wireless communicating device 14 for communicating with apparatuses by wireless, a displaying device 16 that displays communication information and an image 15, designating devices 18 that designate and select a telephone number and character, image or voice data and designate an apparatus to which the data is to be outputted, an address or the like, a receiver 20 that outputs voice, and a transmitter 22.

Figure 2:
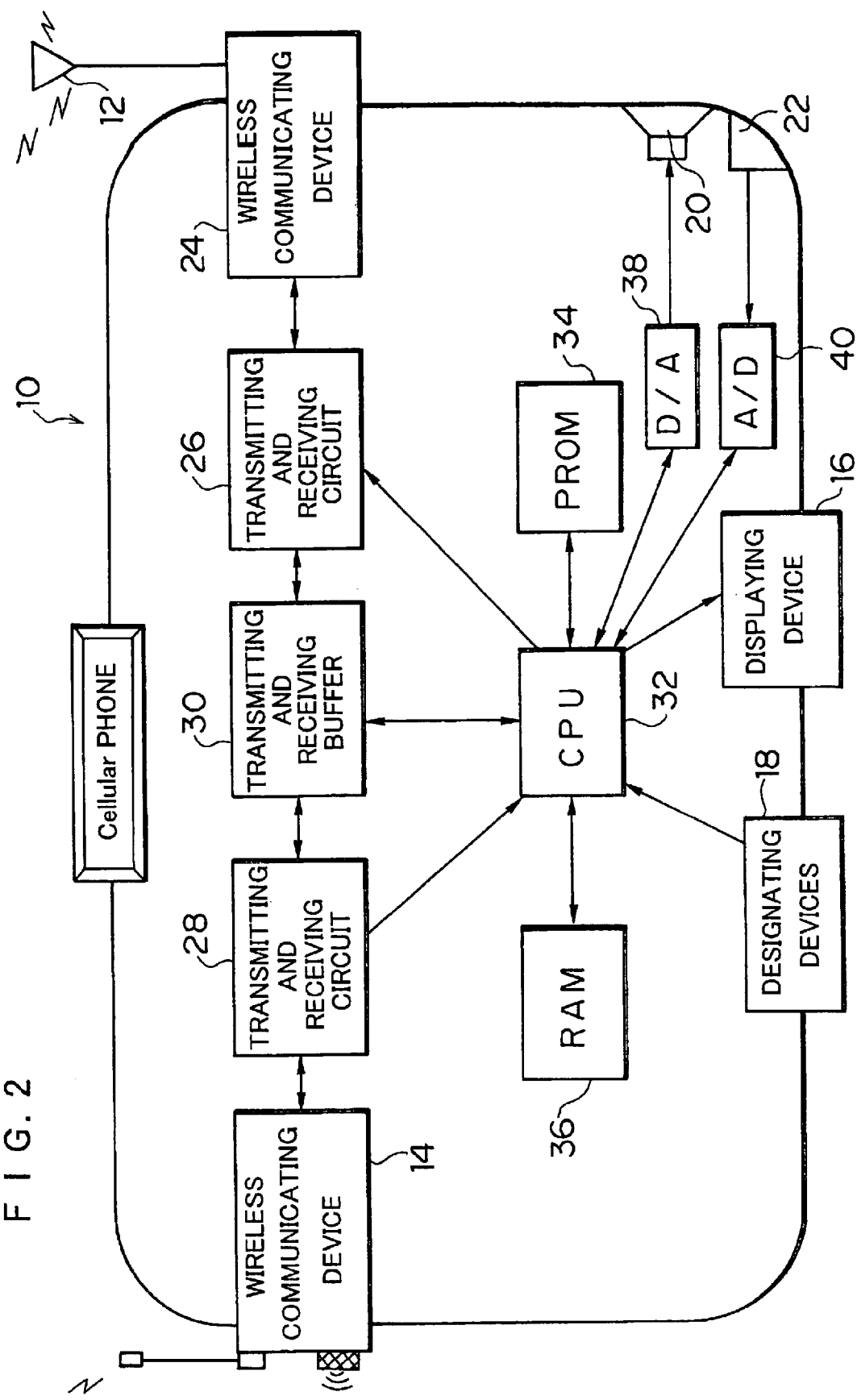
FIG. 2 is a block diagram showing a structure of the telephone in FIG. 1.

FIG. 2 is a block diagram of the telephone 10 to which the present invention is applied.

As shown in FIG. 2, the telephone 10 comprises a wireless communicating device 24 for communicating with a transmitting provider by wireless, a transmitting and receiving circuit 26, the wireless communicating device 14 for communicating with the apparatuses by wireless, a transmitting and receiving circuit 28, and a transmitting and receiving buffer 30 that temporarily stores data that has been received or is to be transmitted.

The telephone 10 also comprises a CPU 32 that controls the whole telephone 10, a PROM 34 that stores a program for operating the, constants, telephone numbers, addresses and so on, a RAM 36 in which the CPU 32 executes a processing, a D/A converter 38 that converts digital voice data into analog voice data for the receiver 20, and an A/D converter 40 that converts analog voice data inputted from the transmitter 22 into digital voice data.

In the telephone 10, the CPU 32 is connected with circuits including the displaying device 16 and the designating devices 18 through a communicating device composed of bus lines and I/Os to control the circuits.

The wireless communicating device 14 uses a light such as an electric wave, a supersonic wave and an infrared light. In the case of the electric wave, the wireless communicating device 14 may use the Bluetooth. In the case of the infrared light, the wireless communicating device 14 may use the IrDA.

Figure 3:
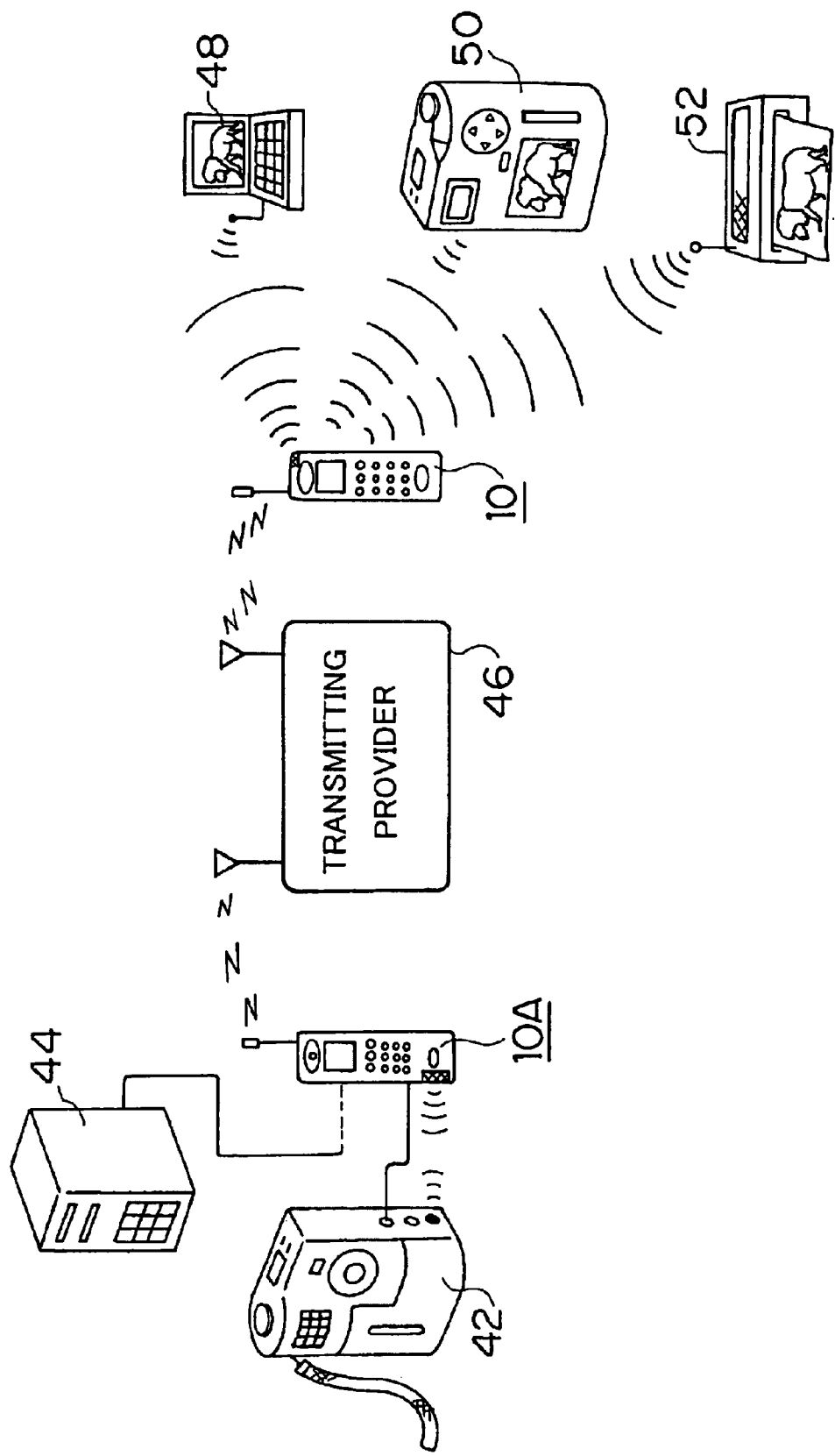
FIG. 3 is a diagram showing a data transmitting method for the telephone in which the telephone receives and transmits data.

FIG. 3 is a diagram showing the data transmitting method for the telephone 10 in which it receives and transmits data.

Information on an image captured by a camera 42 or image, voice or character data stored in a server 44 is transmitted to a cellular phone 10A by wireless or wire. The cellular phone 10A and the telephone 10 start communicating with each other through the transmitting provider 46, and the information on the image, voice or character data stored in the camera 42 or the server 44 or index images are transmitted to the telephone 10 through the cellular phone 10A. The telephone 10 receives the information or the index images, and informs the user of the information or the index images by displaying on the displaying device 16. The user designates data to be received and an apparatus to which the data is to be transmitted with the designating devices 18. The telephone 10 receives the designated data through the transmitting provider 46, and outputs the data to the designated apparatus. The apparatus has a displaying device, a recording device or an outputting device, and is a personal computer 48, a camera 50, a printer 52 or the like.

The cellular phone 10A may start communicating with the telephone 10, and the telephone 10 may start communicating with the cellular phone 10A.

The operation of the telephone 10 when it receives the information on the image, voice or character data will now be explained.

When the CPU 32 of the telephone 10 detects that the telephone 10 has received the information on the image, voice or character data, the displaying device 16 displays a menu selecting picture in FIG. 4. In FIG. 4, a cursor is on an item of a "RECEIVE IMAGE" mode, and the telephone 10 receives information on the images if the user designates "SELECT" (not shown) in this state. As shown in FIG. 4, the telephone 10 has other modes, which are a "TRANSMIT IMAGE" mode for transmitting an image, a "RECEIVE MAIL" mode for receiving characters and a "TRANSMIT MAIL" mode for transmitting characters. The telephone 10 may have modes for receiving and transmitting voice.

Then, the user designates an image to be received while looking at the index image and the information on the image such as a file name displayed on the displaying device in FIG. 16.

The CPU 32 may determine the size of the data to be received and compare it with an available capacity of the RAM 36 or the PROM 34 in the telephone 10, and the data may be stored in the telephone 10 instead of being outputted to an apparatus if possible.

Next, addresses of the apparatuses to which the data is to be transmitted are designated with the designating devices 18, and then the data starts to be transmitted to the designated apparatuses. Since image data, voice data and music data are generally large, the index image is displayed when the image is selected and a title or a file name is displayed when a voice or a mail is selected, and the data is received after the image, voice or character data to be received is selected. After the telephone 10 receives the data through the transmitting provider 46, the data is transmitted to the wireless communicating device 14 through the transmitting and receiving circuit 26, the transmitting and receiving buffer 30 and the transmitting and receiving circuit 28, and outputted to the apparatuses.

The apparatuses that have received the data store, display or print the data.

As described above, the telephone 10 has the wireless communicating device 14 for high-speed-communicating with the apparatuses without the transmitting provider 46, and transmits the data received through the transmitting provider 46 to one or more apparatuses through the wireless communicating device 14, which store, display or print the data. Therefore, the telephone 10 can receive the data and transmit the data to the apparatuses even if the telephone 10 can not store the whole data or display the image of high quality due to the small recording capacity or poor performance of the displaying device.

The telephone 10 is a cellular phone that communicates with the transmitting provider 46 by wireless in the embodiment, but the present invention is not limited to this. The present invention may be applied to a personal handy-phone system (PHS) or a wired telephone.

As explained above, the telephone according to the present invention comprises the designating device that designates an apparatus to which the received data of an image and/or characters is to be transmitted, and the wireless communicating device that communicates with the apparatus without the transmitting provider and transmits the data to the apparatus designated by the designating device. Thus, the desired apparatus can display or store the data received through the transmitting provider.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A data transmission system, comprising:
   a wireless telephone that receives data of at least one of an image and characters through a transmitting provider;
   a designating device on said wireless telephone for designating the data for reception by the wireless telephone and for selectively designating an apparatus to which the received data is to be transmitted;
   a display device on said wireless telephone for displaying information from the received data and displaying a designating address of the apparatus and displaying a menu for designating at least one of transmitting data and receiving data; and
   a wireless communicating device that communicates with the apparatus without the transmitting provider and transmits the data to the apparatus designated by said designating device,
   wherein said menu comprises selections for a receive mode for indicating that data has been received, a transmit image mode for transmitting an image from the wireless telephone to an apparatus, a receive mail mode for receiving characters, and a transmit mail mode for transmitting characters.

2. The system of claim 1, wherein said wireless telephone receives and transmits the data without storing the entire data set on the wireless telephone.

3. The system of claim 1, further comprising:
   a second wireless telephone that receives the data from a computer and transmits the data into the wireless telephone through the transmitting provider.

4. The system of claim 3, wherein said second wireless telephone receives the data from a computer server and transmits the data without storing the entire data set on the second wireless telephone.

5. The system of claim 1, further comprising:
a central processing unit for controlling the telephone and for comparing the size of the data to be received into the wireless telephone with memory capacity of the second telephone to determine if data can be stored on the telephone or must be outputted to an apparatus.

6. The system of claim 5, wherein said central processing unit compares the size of the data to be received with memory capacity of the wireless telephone to determine if data can be stored on the telephone or must be outputted to the apparatus.

7. A data transmission system, comprising:
a wireless telephone that receives data of at least one of an image and characters through a transmitting provider;
a designating device on said wireless telephone for designating the data for reception by the wireless telephone and for selectively designating an apparatus to which the received data is to be transmitted;
a display device on said wireless telephone for displaying information from the received data and displaying a designating address of the apparatus and displaying a menu for designating at least one of transmitting data and receiving data; and
a wireless communicating device that communicates with the apparatus without the transmitting provider and transmits the data to the apparatus designated by said designating device,
wherein said menu comprises selections for a receive mode for indicating that data has been received, a transmit image mode for transmitting an image from the wireless telephone to an apparatus, a receive mail mode for receiving characters, and a transmit mail mode for transmitting characters.

8. A method for transmitting data over a transmitting provider, comprising:
transmitting data from a first wireless telephone to a second wireless telephone through a transmitting provider;
detecting, on the second wireless telephone, the data to be received from the first wireless telephone;
displaying information from the detected data on a display on the second wireless telephone and displaying a menu for designating at least one of transmitting data and receiving data;
designating the data for reception by the second wireless telephone;
receiving the data into the second wireless telephone;
designating an apparatus to which the received data is to be transmitted from the second wireless telephone; and
transmitting the designated data to the designated apparatus without the transmitting provider through a wireless connection device installed on the second wireless telephone,
wherein said receiving and transmitting said data with the second wireless telephone comprises receiving and transmitting a data file on the second wireless telephone without storing the entire data set on the second wireless telephone.

9. The method of claim 8, wherein said displaying information from the received data on a display comprises displaying a received data file as one of an index image, a title, and a file name.

10. The method of claim 8, further comprising:
comparing the size of the data to be received into the second wireless telephone with memory capacity of the second telephone to determine if data can be stored on the telephone or must be outputted to an apparatus.

11. The method of claim 8, wherein said transmitting the designated data to the designated apparatus through a wireless connection device includes designating addresses of apparatuses to which the data is to be transmitted.

12. A method for transmitting data over a transmitting provider, comprising;
transmitting data from a first wireless telephone to a second wireless telephone through a transmitting provider;
detecting on the second wireless telephone, the data to be received from the first wireless telephone;
displaying information from the detected data on a display on the second wireless telephone and displaying a menu for designating at least one of transmitting data and receiving data;
designating the data for reception by the second wireless telephone;
receiving the data into the second wireless telephone;
designating an apparatus to which the received data is to be transmitted from the second wireless telephone; and
transmitting the designated data to the designated apparatus without the transmitting provider through a wireless connection device installed on the second wireless telephone,
wherein displaying information from the detected data on a display includes displaying a menu including selections for a receive mode for indicating that data has been received, a transmit image mode for transmitting an image from the second phone to an apparatus, a receive mail mode for receiving characters, and a transmit mail mode for transmitting characters.

13. A data transmission system, comprising:
at least one wireless telephone comprising:
a first wireless communication device for receiving data;
a first transmitting and receiving circuit coupled to said first wireless communication device;
a transmitting and receiving buffer coupled to said first transmitting and receiving circuit for temporarily storing said data;
a second transmitting and receiving circuit coupled to said transmitting and receiving buffer; and
a second wireless communication device coupled to said second transmitting and receiving circuit for transmitting the data to a designated apparatus without a transmitting provider,
wherein said wireless telephone receives and transmits the data without storing the entire data set on the wireless telephone.

14. The system of claim 13, further comprising:
a second wireless telephone that receives the data from a computer and transmits the data into the wireless telephone through the transmitting provider.

15. The system of claim 13, wherein said wireless telephone further comprises a display device for displaying a menu for designating the data for reception by the wireless telephone and displays received information on data of at least one of images and characters through the transmitting provider.

16. A data transmission system comprising:
at least one wireless telephone, comprising:
a first wireless communication device for receiving data;

a first transmitting and receiving circuit coupled to said first wireless communication device;
a transmitting and receiving buffer coupled to said first transmitting and receiving circuit for temporarily storing said data;
a second transmitting and receiving circuit coupled to said transmitting and receiving buffer; and
a second wireless communication device coupled to said second transmitting and receiving circuit for transmitting the data to a designated apparatus without a transmitting provider; and
a second wireless telephone that receives the data from a computer and transmits the data into the wireless telephone through the transmitting provider,
wherein said second wireless telephone receives the data from a computer server and transmits the data without storing the entire data set on the second wireless telephone.

17. A data transmission system, comprising:
at least one wireless telephone, comprising:
a first wireless communication device for receiving data;
a first transmitting and receiving circuit coupled to said first wireless communication device;
a transmitting and receiving buffer coupled to said first transmitting and receiving circuit for temporarily storing said data;
a second transmitting and receiving circuit coupled to said transmitting and receiving buffer; and
a second wireless communication device coupled to said second transmitting and receiving circuit for transmitting the data to a designated apparatus without a transmitting provider,
wherein said at least one wireless telephone further comprises a central processing unit for controlling the telephone and for comparing the size of the data to be received into the wireless telephone with memory capacity of the wireless telephone to determine at least one of if data can be stored on the telephone and if data must be outputted to an apparatus.

18. The system of claim 17, wherein said central processing unit compares the size of the data to be received with memory capacity of the wireless telephone to determine if data can be stored on the telephone or must be outputted to the apparatus.

19. A data transmission system, comprising:
at least one wireless telephone, comprising:
a first wireless communication device for receiving data;
a first transmitting and receiving circuit coupled to said first wireless communication device;
a transmitting and receiving buffer coupled to said first transmitting and receiving circuit for temporarily storing said data;
a second transmitting and receiving circuit coupled to said transmitting and receiving buffer; and
a second wireless communication device coupled to said second transmitting and receiving circuit for transmitting the data to a designated apparatus without a transmitting provider,
wherein said wireless telephone further comprises a display device for displaying a menu for designating the data for reception by the wireless telephone and displays received information on data of at least one of images and characters through the transmitting provider, and
wherein said menu comprises selections for a receive mode for indicating that data has been received, a transmit image mode for transmitting an image from the wireless telephone to an apparatus, a receive mail mode for receiving characters, and a transmit mail mode for transmitting characters.

20. A wireless telephone, comprising:
a detector for detecting data received from a transmitting provider;
a central processing unit which compares a size of the data to be received with a memory capacity of said wireless telephone to determine if said data can be stored on said telephone;
a designating device for designating the data for reception by the wireless telephone from the transmitting provider and for selectively designating an apparatus to which the received data is to be transmitted; and
a wireless communicating device that communicates with the apparatus without the transmitting provider and transmits the data to the apparatus designated by said designating device.

21. The wireless telephone as set forth in claim 20, further comprising:
a display device that displays a menu for designating the data for reception by the wireless telephone and displays received information on data of at least one of images and characters through the transmitting provider.

22. The wireless telephone as set forth in claim 21, wherein said display device displays the received information, and said designating device allows the user to designate the data to be received from the information displayed by said display device.

23. A data transmitting method for a wireless telephone, comprising:
detecting data received from a transmitting provider;
comparing a size of the data to be received with a memory capacity of said wireless telephone to determine if said data can be stored on said telephone;
designating the data for reception by the wireless telephone from the transmitting provider and for selectively designating an apparatus to which the received data is to be transmitted; and
transmitting the data to a designated apparatus without a transmitting provider.

24. The data transmitting method for the wireless telephone as set forth in claim 23, further comprising:
displaying that the telephone has received information on data of the at least one of image and characters through the transmitting provider and displaying a menu for designating the data for reception by the wireless telephone.

25. The data transmitting method for the wireless telephone as set forth in claim 23, wherein said display comprises allowing a user to designate the data to be received from the transmitting provider.

26. A data transmission system, comprising:
at least one wireless telephone, comprising:
a detector for detecting data received from a transmitting provider;
a central processing unit which compares a size of the data to be received with a memory capacity of said wireless telephone to determine if said data can be stored on said telephone;
a designating device for designating the data for reception by the wireless telephone from the transmitting provider and for selectively designating an apparatus to which the received data is to be transmitted; and a wireless communicating device that communicates with the apparatus without the transmitting provider and transmits the data to the apparatus designated by said designating device.

27. The system of claim 26, wherein said wireless telephone receives and transmits the data without storing the entire data set on the wireless telephone.

28. The system of claim 26, further comprising:

a second wireless telephone that receives the data from a computer and transmits the data into the wireless telephone through the transmitting provider.

29. The system of claim 28, wherein said second wireless telephone receives the data from a computer server and transmits the data without storing the entire data set on the second wireless telephone.

30. The system of claim 28, wherein said second wireless telephone transmits the data without storing the entire data set on the second wireless telephone.

31. The system of claim 26, wherein said wireless telephone further comprises a display device for displaying a menu for designating the data for reception by the wireless telephone and displays received information on data of at least one of images and characters through the transmitting provider.

32. The system of claim 31, wherein said menu comprises selections for a receive mode for indicating that data has been received, a transmit image mode for transmitting an image from the wireless telephone to an apparatus, a receive mail mode for receiving characters, and a transmit mail mode for transmitting characters.

33. The system of claim 31, wherein said menu comprises selections for at least one of a transmit image mode for transmitting an image from the wireless telephone to an apparatus, a receive mail mode for receiving characters, and a transmit mode for transmitting characters.

34. The system of claim 26, wherein said wireless telephone at least one of receives and transmits the data without storing the entire data set on the wireless telephone.

35. A data transmission system, comprising:

a wireless telephone that receives data of at least one of an image and characters through a transmitting provider;

a designating device on said wireless telephone for designating the data for reception by the wireless telephone and for selectively designating an apparatus to which the received data is to be transmitted;

a display device on said wireless telephone for displaying information from the received data and displaying a designating address of the apparatus and displaying a menu for designating at least one of transmitting data and receiving data; and a wireless communicating device that communicates with the apparatus without the transmitting provider and transmits the data to the apparatus designated by said designating device, wherein said display includes a menu comprising selections for at least one of a transmit image mode for transmitting an image from the wireless telephone to an apparatus, a receive mail mode for receiving characters, and a transmit mail mode for transmitting characters.

36. A data transmission system, comprising:

a wireless telephone that receives data of at least one of an image and characters through a transmitting provider;

a designating device on said wireless telephone for designating the data for reception by the wireless telephone and for selectively designating an apparatus to which the received data is to be transmitted;

a display device on said wireless telephone for displaying information from the received data and displaying a designating address of the apparatus and displaying a menu for designating at least one of transmitting data and receiving data; and a wireless communicating device that communicates with the apparatus without the transmitting provider and transmits the data to the apparatus designated by said designating device, wherein said menu comprises selections for at least one of a transmit image mode for transmitting an image from the wireless telephone to an apparatus, a receive mail mode for receiving characters, and transmit mode for transmitting characters.

37. A method for transmitting data over a transmitting provider, comprising:

transmitting data from a first wireless telephone to a second wireless telephone through a transmitting provider;

detecting, on the second wireless telephone, the data to be received from the first wireless telephone;

displaying information from the detected data on a display on the second wireless telephone and displaying a menu for designating at least one of transmitting data and receiving data;

designating the data for reception by the second wireless telephone;

receiving the data into the second wireless telephone, designating an apparatus to which the received data is to be transmitted from the second wireless telephone; and transmitting the designated data to the designated apparatus without the transmitting provider through a wireless connection device installed on the second wireless telephone, wherein said receiving and transmitting said data with the second wireless telephone comprises at least one of receiving and transmitting a data file on the second wireless telephone without storing the entire data set on the second wireless telephone.

38. A method for transmitting data over a transmitting provider, comprising:

transmitting data from a first wireless telephone to a second wireless telephone through a transmitting provider;

detecting, on the second wireless telephone, the data to be received from the first wireless telephone;

displaying information from the detected data on a display on the second wireless telephone and displaying a menu for designating at least one of transmitting data and receiving data;

designating the data for reception on by the second wireless telephone;

receiving the data into the second wireless telephone;

designating an apparatus to which the received data is to be transmitted from the second wireless telephone; and transmitting the designated data to the designated apparatus without the transmitting provider through a wireless connection device installed on the second wireless telephone, wherein displaying information from the detected data on a display comprises at least one of displaying a menu including selections for a transmit image mode for transmitting an image from the second phone to an apparatus, a receive mail mode for receiving characters, and a transmit mail mode for transmitting characters.

39. A data transmission system, comprising:

at least one wireless telephone, comprising:
- a first wireless communication device for receiving data;
- a first transmitting and receiving circuit coupled to said first wireless communication device;
- a transmitting and receiving buffer coupled to said first transmitting and receiving circuit for temporarily storing said data;
- a second transmitting and receiving circuit coupled to said transmitting and receiving buffer; and
- a second wireless communication device coupled to said second transmitting and receiving circuit for transmitting the data to a designated apparatus without a transmitting provider; and a second wireless telephone that receives the data from a computer and transmits the data into the wireless telephone through the transmitting provider wherein said second wireless telephone transmits the data without storing the entire data set on the second wireless telephone.

40. A data transmission system, comprising:

at least one wireless telephone, comprising:
- a first wireless communication device for receiving data;
- a first transmitting and receiving circuit coupled to said first wireless communication device;
- a transmitting and receiving buffer coupled to said first transmitting and receiving circuit for temporarily storing said data;
- a second transmitting and receiving circuit coupled to said transmitting and receiving buffer; and
- a second wireless communication device coupled to said second transmitting and receiving circuit for transmitting the data to a designated apparatus without transmitting provider, wherein said wireless telephone further comprises a display device for displaying a menu for designating the data for reception by the wireless telephone and displays received information on data of at least one of images and characters through the transmitting provider, and wherein said menu comprises selections for at least one of a transmit image mode for transmitting an image from the wireless telephone to an apparatus, a receive mail mode for receiving characters, and a transmit mail mode for transmitting characters.

* * * * *